United States Patent [19]
Morinaka

[11] Patent Number: 5,335,128
[45] Date of Patent: Aug. 2, 1994

[54] CLEANING ROLLER FOR HEAD CYLINDER OF MAGNETIC TAPE UNIT

[75] Inventor: Kouji Morinaka, Osaka, Japan

[73] Assignee: Funai Electric Co., Ltd., Osaka, Japan

[21] Appl. No.: 876,172

[22] Filed: Apr. 30, 1992

[30] Foreign Application Priority Data

Dec. 10, 1991 [JP] Japan ............................. 3-349959

[51] Int. Cl.⁵ .............................................. G11B 5/41
[52] U.S. Cl. .................................................. 360/128
[58] Field of Search ......................................... 360/128

[56] References Cited

U.S. PATENT DOCUMENTS 5,170,304  12/1992  Katohno ........................... 360/128

FOREIGN PATENT DOCUMENTS 60-20251   5/1985  Japan .
1/294215  11/1989  Japan ................................ 360/128
3/156716   7/1991  Japan ................................ 360/128

Primary Examiner—A. J. Heinz
Attorney, Agent, or Firm—Keck, Mahin & Cate

[57] ABSTRACT

A cleaning roller for a head cylinder, particularly for video heads, of a magnetic tape unit, is characterized in that an insert hole, receiving a support shaft for a cleaning roller cylinder, includes two wide portions and one narrow portion. This enables the cleaning roller to always contact closely and evenly with the head cylinder, since vibrations caused by the support shaft are absorbed by the insert hole.

4 Claims, 3 Drawing Sheets

CLEANING ROLLER FOR HEAD CYLINDER OF MAGNETIC TAPE UNIT

BACKGROUND OF THE INVENTION

The present invention relates to a cleaning roller for the head cylinder of a magnetic tape unit and, particularly, for the type of head installed on a rotating cylinder or drum.

In general, a head cylinder is apt to incur malfunctions due to grazing caused by air-borne dust or magnetic powders evolving when said head cylinder scans onto the magnetic tape, always resulting in very intensive requests for cleaning said head cylinder, particularly in the case of video heads.

Heretofore, as shown in FIG. 7, such cleaning has been performed by means of a roller 2 to contact with the surface of a head cylinder 1, wherein said roller 2 is installed rotatably at the end of an arm 5 fixed turnably to a chassis 4, and said roller 2, as shown in FIG. 4, comprises a pad 7 wound around a cylindrical core 6, having an insert hole, with even diameter throughout, to receive a support shaft 8 secured to said arm 5.

Contacting of said roller 2 with the surface of said head cylinder 1 is performed by electrically or mechanically vibrating said arm 5, being synchronized with head cylinder for a certain while during the inertia term of a video head 3, except when video-recording or video-regenerating, at the start of loading, or, since the termination of video head (Jpn. Pat. Publn. No. Sho 60-20251).

The video head 3 is installed to said rotating head cylinder, projecting by 30–60 μm from the surface of said cylinder 1. Therefore, as shown in FIG. 4, the surface 7a of a cleaning roller 2 shall, always, be contacted evenly with said cylinder 1, otherwise resulting in poor cleaning effects due to the elimination of said contact whatsoever.

The known roller 2, however, as shown in FIG. 4, is very sensitive to vibrations of the axis of a shaft 8, being able to effect even and close contact of said surface 7a with said head cylinder 1 only when the axis 8a of said shaft 8 is parallel to said head cylinder 1. However, in case of axis vibration, as shown in FIG. 5 or FIG. 6, in the prior art, poor cleaning effects have emerged due to clearance between said surface 7a and said cylinder 1.

Thus, it has been extremely difficult to make perfect alignment of said shaft 8. Besides, any irregularity or unevenness during the manufacturing process of unit components, such as said arm 5, said shaft 8 and said cylinder 6, has also resulted in said poorness in cleaning.

SUMMARY OF THE INVENTION

The object of the present invention is, eliminating said defects in prior art, to provide such a cleaning roller operable to attain a constantly even and close contact between said roller surface and said head cylinder, due to the absorption of any axis vibration of said shaft.

DETAILED DESCRIPTION OF THE INVENTION

Figure 1:
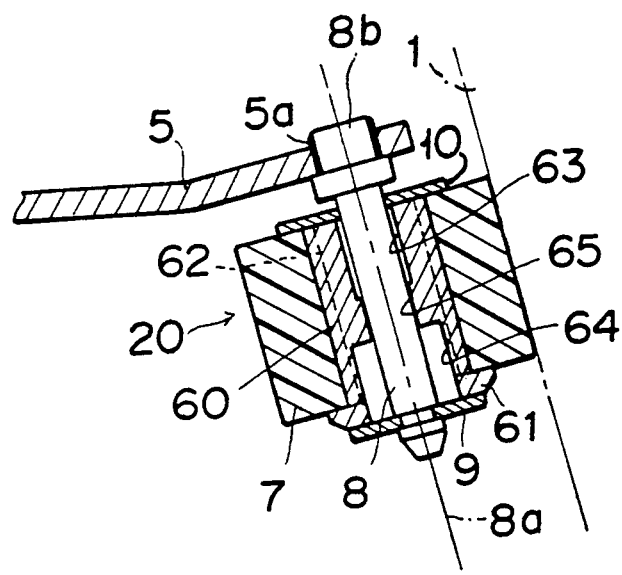
FIGS. 1–3 illustrate functions and structures of the present invention.
Figure 2:
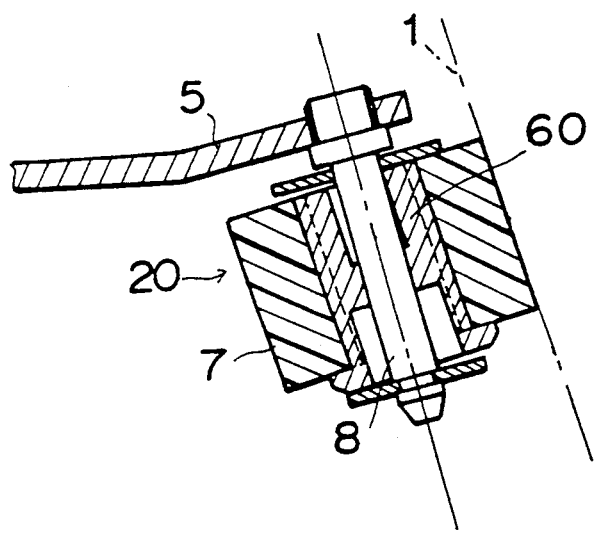
Figure 3:
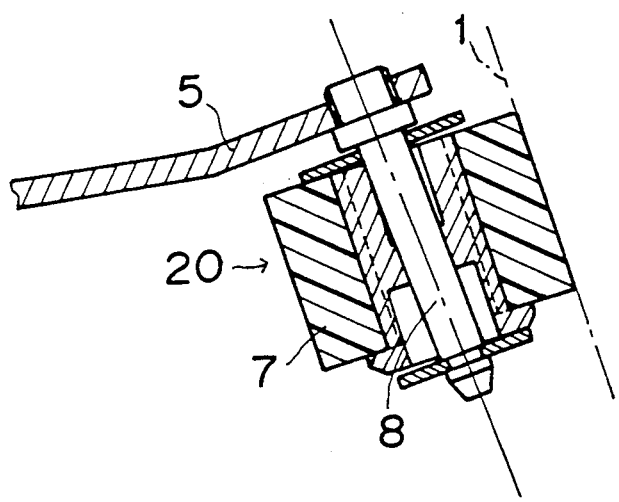
Figure 4:
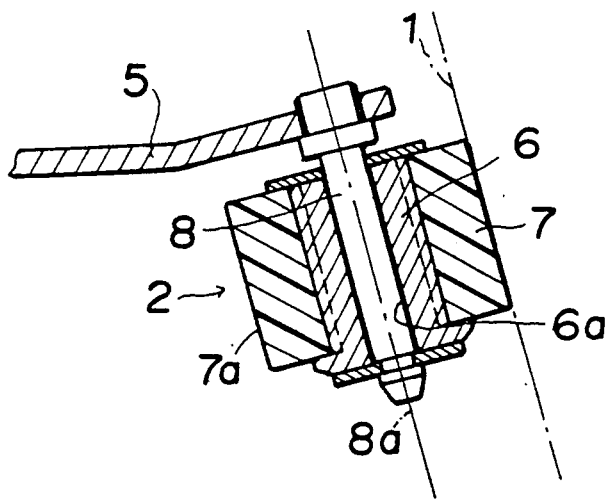
FIGS. 4–6 illustrate functions and structures of the prior art.
Figure 5:
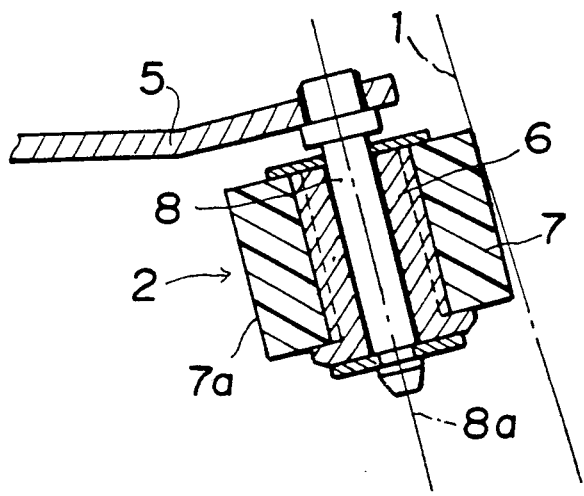
Figure 6:
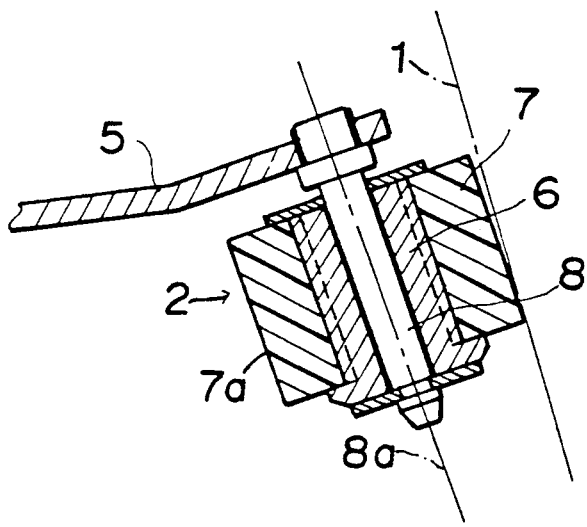

In order to accomplish the object, as mentioned above, the present invention is characterized in that, as illustrated in FIGS. 1 through 3, a cleaning roller 20, comprising a cylinder 60 which has such an insert hole 63, 64 and 65 as apparently different from that in prior arts whereas the other structures are approximately the same as said arts.

Namely, said cylinder 60 has a flange 61 at one end, a longitudinal groove 62 on the surface of said cylinder and an insert hole 63, 64 and 65 for a support shaft 8. Said groove 62 is to secure a cleaning pad 7 wherein the inside end of said pad 7 is bedded into said groove 62 so that said cylinder 60 and said pad 7 will move en bloc.

An insert-hole of said cylinder 60 comprises 3 portions, i.e., an upper portion 63 and a lower portion 64, both of which have such i.d.'s as greater than that of said support shaft 8, and a center portion 65 with such an i.d. approximately same as that of said support shaft 8 to just receive this. The diameters of portions 63 and 64 may be just equal, regardless of FIGS. 1–3 which illustrate that the upper is smaller than the lower depending only on the context in the shape of the mold-die.

Figure 7:
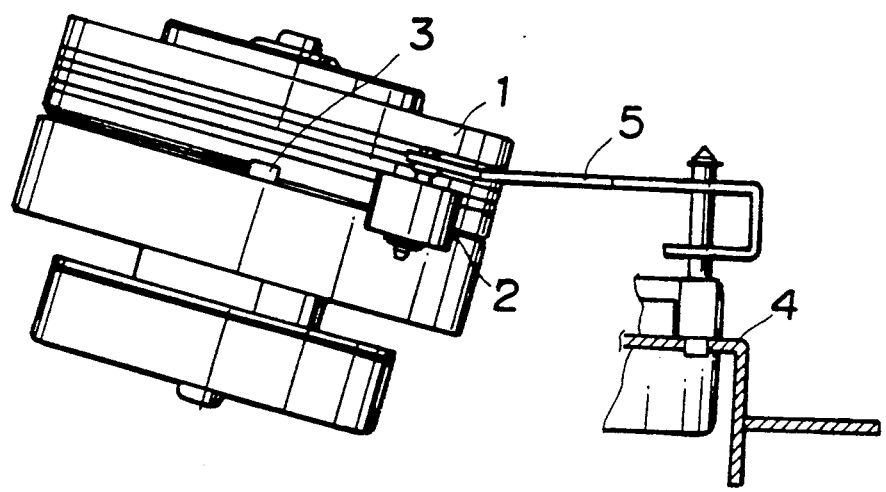
FIG. 7 shows the installation of a cleaning roller for a magnetic tape unit.

As a material for said pad 7, that with a dense texture without any nap, not abrading the video head 3 in FIG. 7, but adsorbing any magnetic powders and dusts well, including a deerskin, a long-fibered cloth, or a high-grade Japanese paper, for example, shall be selected.

The roller 20, formulated as above, is installed to the tip of an arm 5 by means of screwing-up a screwed portion 8b formed at the end of the shaft 8 into a screwed hole 5a of said arm 5 after inserting the shaft 8 into said insert hole 63, 64 and 65.

Said roller 20 is secured to said insert shaft by the stopper-plate 9, to rotate freely, and simultaneously, to vibrate around center portion 65 of said insert hole, relative to said support shaft 8.

In FIG. 1, 10 denotes a cover-plate for the opening of said upper portion 63 which is installed movably along the axis of said shaft 8.

Thus, said cleaning roller 20 will, not only in case of no vibration of said roller (FIG. 1) due to the high accuracy of alignment of said shaft 8, but also in case of vibration of said roller (FIGS. 2, 3) keep said pad 7 to mate closely and evenly with said head surface 1, because of the counter-wise absorption of vibrations caused by said shaft 8.

As a result, poor cleaning effects due to axis vibrations of said shaft 8 can be fully eliminated.

I claim:

1. A cleaning roller for a head cylinder of a magnetic tape unit comprising:
   a substantially cylindrical cleaning pad having a bore formed therein;
   a cylinder received within said bore and having an insert hole passing therethrough, said insert hole including a small diameter center portion and a pair of larger diameter end portions, said center portion being disposed between said end portions and having an inner diameter which is substantially smaller than inner diameters of said end portions;
   a support shaft extending through said insert hole and having an outer diameter which is approximately the same size as the inner diameter of said center portion and substantially smaller than inner diameters of said end portions so that said cylinder is supported on said shaft by said small diameter center portion of said insert hole;

said cleaning pad and cylinder being rotatable around said support shaft and pivotable around said center portion of said insert hole, relative to said support shaft, so that said pad is always kept in close and even contact with a surface of said head cylinder;

said cylinder being formed with a groove in an outer circumferential surface thereof in which an inner portion of said cleaning pad is embedded so that said cylinder and said cleaning pad move together as a unit; and a stopper plate mounted on said support shaft and engaging one end of said cylinder to secure said cleaning roller to said support shaft;

said one end of said cylinder being formed by a flange overlying part of one end of said cleaning pad.

2. A cleaning roller as defined by claim 1, wherein the inner diameter of one of said end portions is larger than the inner diameter of the other of said end portions.

3. A cleaning roller for a head cylinder of a magnetic tape unit comprising:

a substantially cylindrical cleaning pad having a bore formed therein;

a cylinder received within said bore and having an insert hole passing therethrough, said insert hole including a small diameter center portion and a pair of larger diameter end portions, said center portion being disposed between said end portions and having an inner diameter which is substantially smaller than inner diameters of said end portions;

a support shaft extending through said insert hole and having an outer diameter which is approximately the same size as the inner diameter of said center portion and substantially smaller than inner diameters of said end portions so that said cylinder is supported on said shaft by said small diameter center portion of said insert hole;

said cleaning pad and cylinder being rotatable around said support shaft and pivotable around said center portion of said insert hole, relative to said support shaft, so that said pad is always kept in close and even contact with a surface of said head cylinder;

said cylinder being formed with a groove in an outer circumferential surface thereof in which an inner portion of said cleaning pad is embedded so that said cylinder and said cleaning pad move together as a unit;

a stopper plate mounted on said support shaft and engaging one end of said cylinder to secure said cleaning roller to said support shaft;

and a cover plate covering another end of said cylinder opposite to said one end of said cylinder and moveable along a longitudinal axis of said support shaft.

4. A cleaning roller as defined by claim 3, wherein the inner diameter of one of said end portions is larger than the inner diameter of the other of said end portions.

* * * * *